United States Patent
Yoshida (10) Patent No.: US 9,948,836 B2
(45) Date of Patent: Apr. 17, 2018

(54) ELECTRONIC APPARATUS WITH ROTATIONALLY-OPERATED MEMBER

(71) Applicant: CANON KABUSHIKI KAISHA, Tokyo (JP)

(72) Inventor: Takashi Yoshida, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 15 days.

(21) Appl. No.: 15/261,109

(22) Filed: Sep. 9, 2016

(65) Prior Publication Data

US 2017/0078534 A1    Mar. 16, 2017

(30) Foreign Application Priority Data

Sep. 11, 2015 (JP) ................................. 2015-179612

(51) Int. Cl.
| | | |
|---|---|---|
| *H04N 5/225* | (2006.01) | |
| *H04N 5/232* | (2006.01) | |
| *H04N 5/238* | (2006.01) | |

(52) U.S. Cl.
CPC .......... *H04N 5/2251* (2013.01); *H04N 5/238* (2013.01); *H04N 5/23216* (2013.01)

(58) Field of Classification Search
CPC ..................................................... H04N 5/238
See application file for complete search history.

(56) References Cited

U.S. PATENT DOCUMENTS 9,232,134 B2 * 1/2016 Yuge ...................... H04N 5/225
9,307,125 B2 * 4/2016 Katsumata .............. G01S 17/46
2013/0071101 A1 * 3/2013 Idera ...................... G02B 7/102
396/531

(Continued)

FOREIGN PATENT DOCUMENTS

| GB | 832612 A | 4/1960 |
|---|---|---|
| JP | 2006-260949 A | 9/2006 |
| JP | 2008-293814 A | 12/2008 |

(Continued)

OTHER PUBLICATIONS

Oct. 20, 2017 Taiwanese Notice of Allowance, which is enclosed without an English Translation, that issued in Taiwanese Patent Application No. 105129340.

*Primary Examiner* — Gary C Vieaux
(74) *Attorney, Agent, or Firm* — Cowan, Liebowitz & Latman, P.C.

(57) ABSTRACT

An electronic apparatus which reduces the size of an operating ring in a radial direction while ensuring good operability using a click mechanism of the operating ring. A rotary member which rotates integrally with the operating ring has click holes formed on an inner peripheral side of concave portions and convex portions formed alternately in an outer peripheral portion. As the operating ring is rotationally operated, a ball is repeatedly engaged with and pulled out from the click hole to generate a click feel on the operating ring, and the concave and convex portions are repeatedly detected to detect a rotating direction and a rotationally-operated amount of the operating ring. The click holes, concave portions, and convex portions are formed in the rotary member such that the click holes and the concave portions are not aligned in a direction perpendicular to a rotation center of the rotary member.

6 Claims, 7 Drawing Sheets

(56) References Cited

U.S. PATENT DOCUMENTS

2013/0220060 A1    8/2013   Sano et al.

FOREIGN PATENT DOCUMENTS

| JP | 2011-008970 A | 1/2011 |
| JP | 2013-105101 A | 5/2013 |
| JP | 2013-206662 A | 10/2013 |
| JP | 2014-142705 A | 8/2014 |
| TW | I327323 | 7/2010 |

* cited by examiner

ELECTRONIC APPARATUS WITH ROTATIONALLY-OPERATED MEMBER

BACKGROUND OF THE INVENTION

Field of the Invention

The present invention relates to an electronic apparatus including an image pickup apparatus such as a digital camera, and in particular to an electronic apparatus having a rotationally-operated member that is able to be rotationally operated.

Description of the Related Art

In some electronic apparatuses such as digital cameras, generally, an operating ring in an outer peripheral portion of a lens barrel is rotationally operated to adjust the zoom and focus of a lens barrel or change setting parameters based on a rotational direction and a rotationally-operated amount of the operating ring. There are also known electronic apparatuses equipped with a click mechanism that makes it easier to grasp of a rotationally-operated amount of the operating ring so as to enhance operability.

Conventionally, there has been proposed a technique that forms a first hole for a click mechanism and a second hole for detecting a rotational direction and a rotationally-operated amount in a rotary member which rotates in conjunction with an operating ring such that the first hole and the second hole are connected together in a diametrical direction (see Japanese Laid-Open Patent Publication (Kokai) No. 2011-8970).

According to Japanese Laid-Open Patent Publication (Kokai) No. 2011-8970, however, the first hole, the second hole, and an outermost area for ensuring stiffness are formed in the rotary member which rotates in conjunction with the operating ring such that they are connected to one another in the diametrical direction, and this brings about an increase in the size of the operating ring in a radial direction, and by extension an increase in the size of an electronic apparatus.

SUMMARY OF THE INVENTION

The present invention provides an electronic apparatus which reduces the size of a rotationally-operated member in a radial direction while ensuring good operability using a click mechanism of the rotationally-operated member.

Accordingly, the present invention provides an electronic apparatus comprising a rotationally-operated member, a rotary member configured to be able to rotate integrally with the rotationally-operated member, and comprise first concave portions and first convex portions that are formed alternately in an outer peripheral portion, and multiple click holes formed on an inner peripheral side of the first concave portions and the first convex portions in a circumferential direction, a click feel generating member configured to, in response to the rotationally-operated member being rotationally operated, repeatedly comes to a state of being in engagement with the click hole and to a state of being pulled out from the click hole to generate a click feel on the rotationally-operated member, and a detection unit configured to, in response to the rotationally-operated member being rotationally operated, repeatedly comes to a state of detecting the first concave portions of the rotary member and to a state of detecting the first convex portions of the rotary member to detect a rotating direction and a rotationally-operated amount of the rotationally-operated member, wherein the click holes, the first concave portions, and the first convex portions are formed in the rotary member such that the click holes and the first concave portions are not aligned in a direction perpendicular to a rotation center of the rotary member.

According to the present invention, the size of the rotationally-operated member in a radial direction is reduced while good operability is ensured using a click mechanism of the rotationally-operated member.

Further features of the present invention will become apparent from the following description of exemplary embodiments (with reference to the attached drawings).

DESCRIPTION OF THE EMBODIMENTS

Hereafter, embodiments of the present invention will be described with reference to the drawings.

Figure 1A:
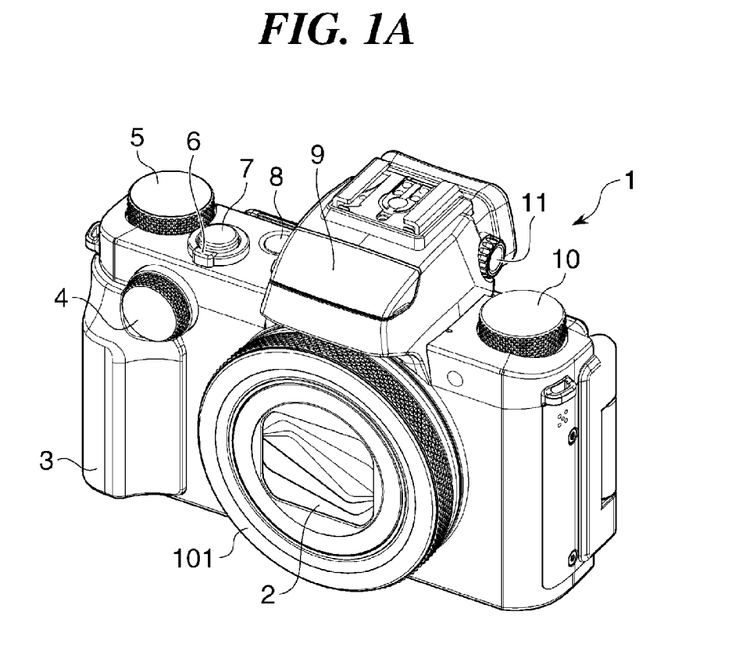
FIG. 1A is a perspective view showing a digital camera that is a first embodiment of an electronic apparatus according to the present invention as seen from front (subject side)
Figure 1B:
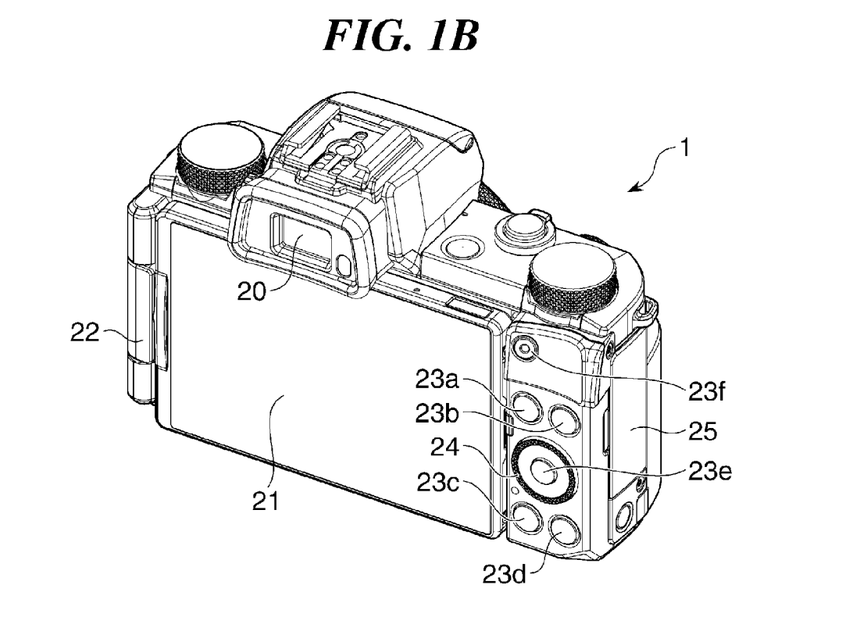
FIG. 1B is a perspective view showing the digital camera in FIG. 1A as seen from behind.

FIG. 1A is a perspective view showing a digital camera that is a first embodiment of an electronic apparatus according to the present invention as seen from front (subject side), and FIG. 1B is a perspective view showing the digital camera in FIG. 1A as seen from behind. It should be noted that although in the present embodiment, the digital camera which is an exemplary image pickup apparatus is taken as an example of the electronic apparatus, the present invention is not limited to this.

As shown in FIG. 1A, in the digital camera 1 according to the present embodiment, a lens barrel 2 is provided on a front side, and on outer peripheral side of the lens barrel 2, an operating ring 101 is provided such that it is able to be rotationally operated. By rotationally operating the operating ring 101, the zoom and focus of the lens barrel 2 are adjusted, or shooting parameters are changed. A grip portion 3 is disposed on a left side of the lens barrel 2 in the digital camera 1, and an electronic dial 4 for changing shooting parameters is provided above the grip portion 3. A power button 8, a release button 7, a zoom lever 6, an exposure compensation dial 5, a mode dial 10, a diopter scale adjustment dial 11, a pop-up type strobe unit 9, and so forth are provided on an upper surface of the digital camera 1. The operating ring 101 corresponds to an exemplary rotationally-operated member of the present invention.

As shown in FIG. 1B, on a rear side of the digital camera 1, a display device 21 such as an LCD is supported such that it is able to rotationally move on a biaxial hinge portion 22 in an opening and closing direction and able to rotate in an opened state. A finder display unit 20 is provided above the display device 21, and a variety of operating buttons 23a to 23f and a control wheel 24, which is able to be rotationally operated, are provided on a right side of the display device 21. On a side of the digital camera 1 on the grip portion 3 side, a connector cover 25 which covers an external terminal connector such that it is able to open and close is provided.

Figure 2:
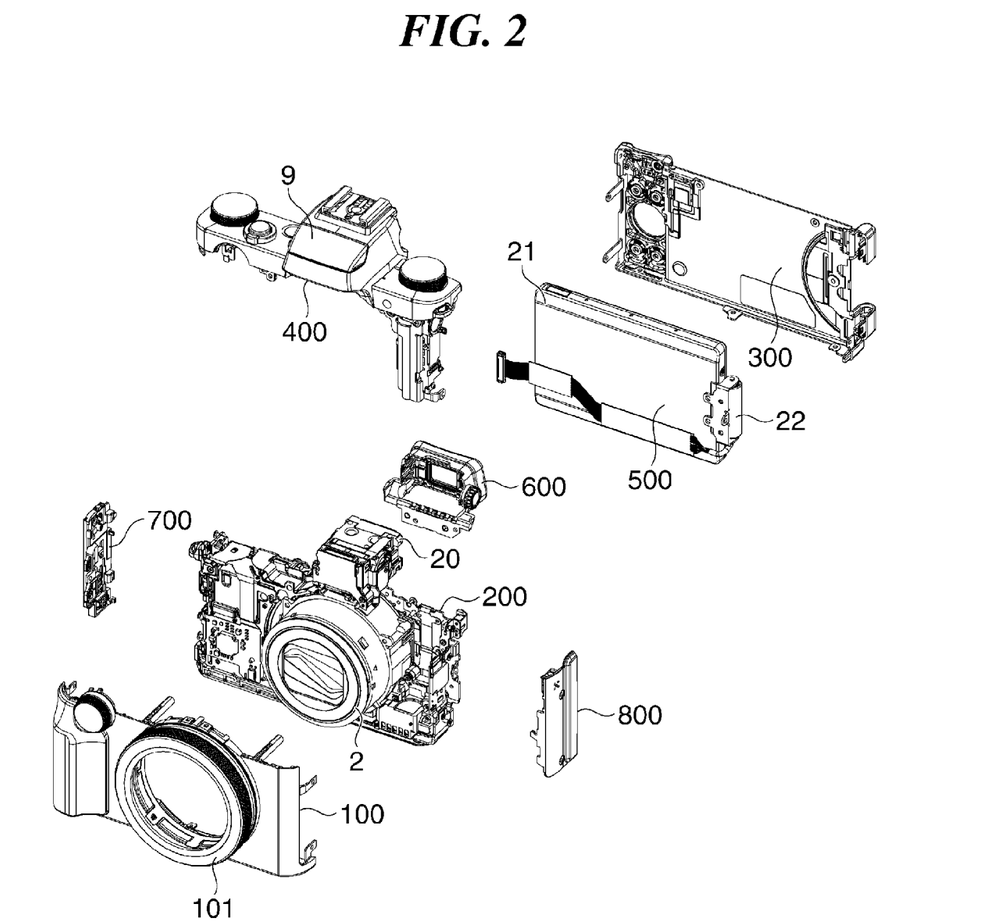
FIG. 2 is an exploded perspective view showing the digital camera in FIG. 1A.

FIG. 2 is an exploded perspective view showing the digital camera 1 in FIG. 1A. As shown in FIG. 2, the lens barrel 2, the finder display unit 20, a battery housing unit, not shown, an electronic circuit board, not shown, and so forth are mounted on a camera main body 200 of the digital camera 1, and in this state, a top cover unit 400 and a display unit 500 are mounted on the camera main body 200. The display unit 500 has the display device 21 and the biaxial hinge portion 22 which are configured as an integral unit. An eyepiece unit 600 is mounted on the finder display unit 20.

Further, a left side cover unit 700 and a right side cover unit 800 are mounted on the camera main body 200, and lastly, a front cover unit 100 and a rear cover unit 300 are mounted on a front side and a rear side, respectively, of the camera main body 200. The digital camera 1 is thus assembled.

Figure 3:
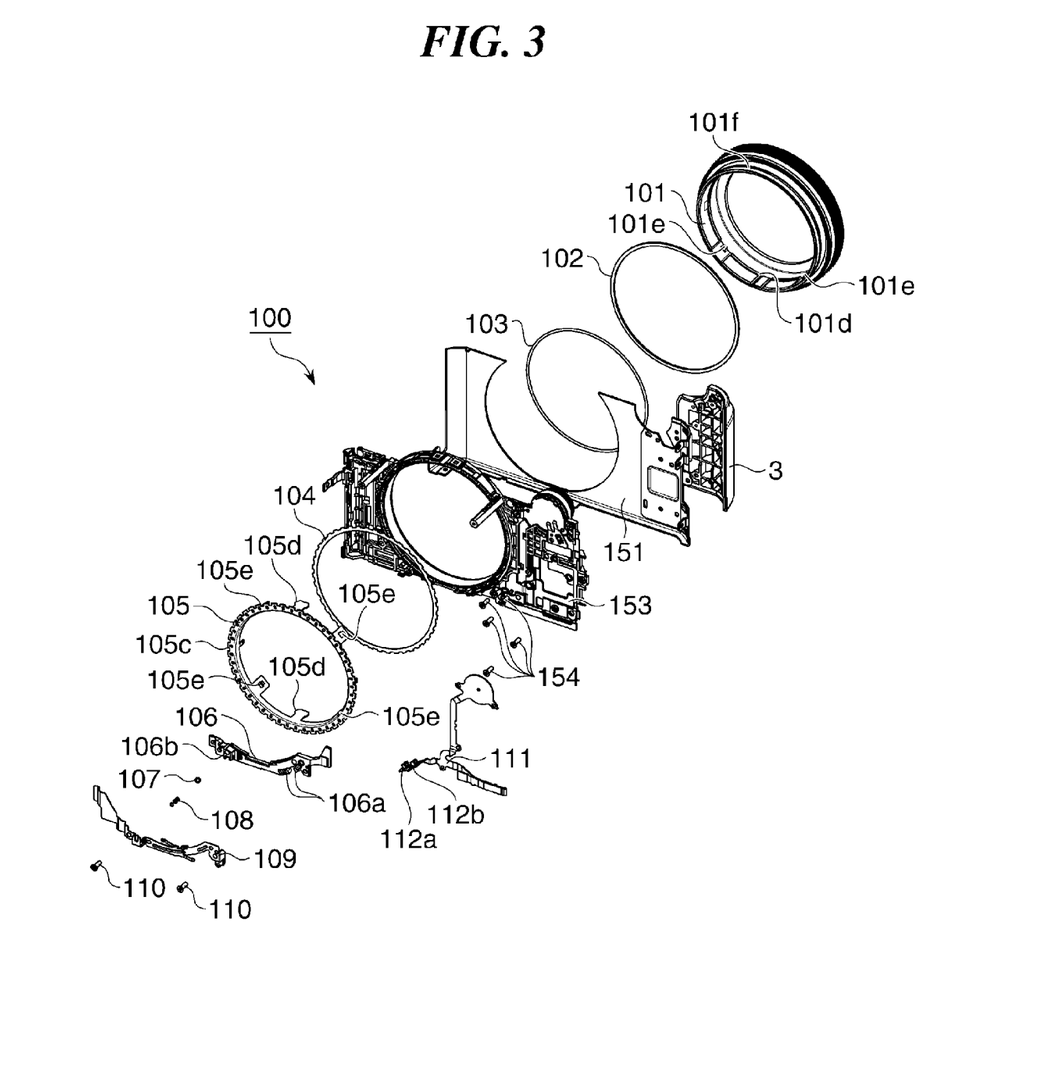
FIG. 3 is an exploded perspective view showing a front cover unit.

FIG. 3 is an exploded perspective view showing the front cover unit 100. As shown in FIG. 3, a front cover 151, which forms an exterior of the digital camera 1 on the front side, is attached to a front base member 153 of the front cover unit 100 with double-faced tape and fixed to the front base member 153 with an adhesive or the like. The grip portion 3 is mounted on the front cover 151 and fastened using screws 154 or the like.

The operating ring 101 as well is mounted on the front base member 153. A ring-shaped urging member 102 with a cushioning property is attached to the operating ring 101 with double-faced tape or the like, and an O-ring 103 with an excellent sliding capability such as fluorine rubber is mounted on a circumferential groove 101f of the operating ring 101.

A rotary member 105, which is able to rotate integrally with the operating ring 101, is mounted on the front base member 153, and the front base member 153 is sandwiched between the operating ring 101 and the rotary member 105. In an outer peripheral portion of the rotary member 105, a plurality of rotational position restricting portions 105d and a plurality of hooking portions 105e that project toward the front side are provided in a circumferential direction. The rotational position restricting portions 105d are formed for rotational position restricting concave portions 101d of the operating ring 101, and the hooking portions 105e are engaged with projecting portions 101e of the operating ring 101 in a state where the rotational position restricting portions 105d are placed in phase with the rotational position restricting concave portions 101d.

The hooking portions 105e are provided at four locations at substantially regular intervals in the circumferential direction of the rotary member 105. If the hooking portions 105e are provided at three locations in the rotary member 105, the operating ring 101 easily falls off when one of the hooking portions 105e comes off due to external shock, and hence it is necessary to increase the strength of each one of the hooking portions 105e.

On the other hand, if the strength of each one of the hooking portions 105e is excessively increased, the ease of assembly is likely to be compromised. For this reason, by providing the hooking portions 105e at four locations in the rotary member 105, a required strength of each one of the hooking portions 105e is ensured without compromising the ease of assembly. A sliding sheet 104 is attached to the rotary member 105. The sliding sheet 104 is interposed between the rotary member 105 and the front base member 153, and when the rotary member 105 rotates, the sliding sheet 104 is sliding in contact with the front base member 153 in a rotational direction. It should be noted that detailed description of the rotary member 105 and the sliding sheet 104 will be given later.

A flexible substrate 111 on which photo interrupters 112a and 112b are included is mounted on the front base member 153. The photo interrupters 112a and 112b each have a light-emitting element and a light-receiving element such as a photodiode. When there is a light-shielding member between the light-emitting element and the light-receiving element, the light-receiving element cannot receive light since light from the light-emitting element is shielded, and when there is no light-shielding member between the light-emitting element and the light-receiving element, the light-receiving element is able to receive light.

Further, a holding member 106 is mounted on the front base member 153. An arm portion 106a of the holding member 106 presses and fixes the flexible substrate 111. A guide hole 106b is formed in the holding member 106. A ball 107 and a spring 108 are fitted into the guide hole 106b, and in this state, a spring holding member 109 is mounted on the holding member 106 and fastened using screws 110 to assemble the front cover unit 100. The ball 107 corresponds to an exemplary click feel generating member of the present invention. The ball 107 corresponds to an exemplary member having a spherical shape which is urged toward click holes 105c.

Figure 4A:
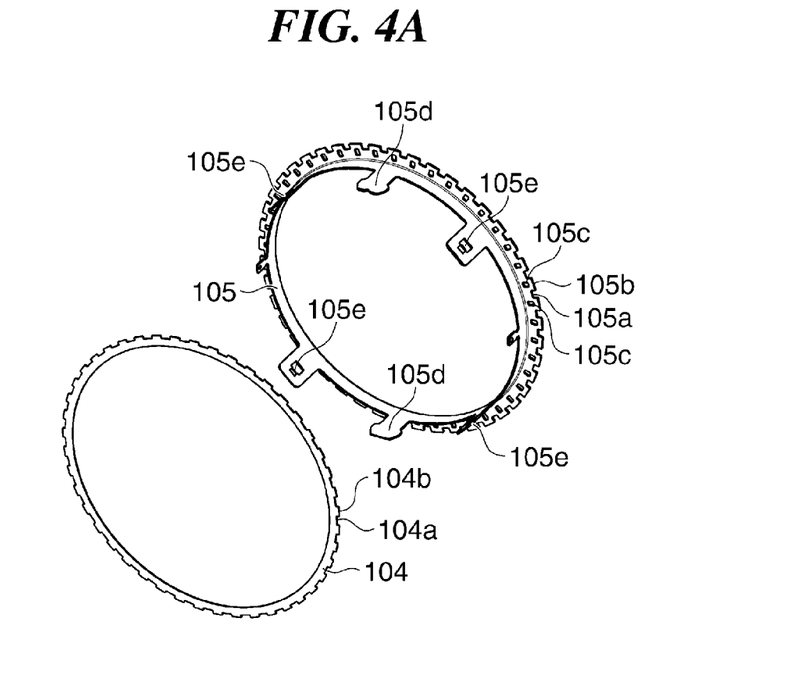
FIG. 4A is an exploded perspective view showing a rotary member and a sliding sheet.
Figure 4B:
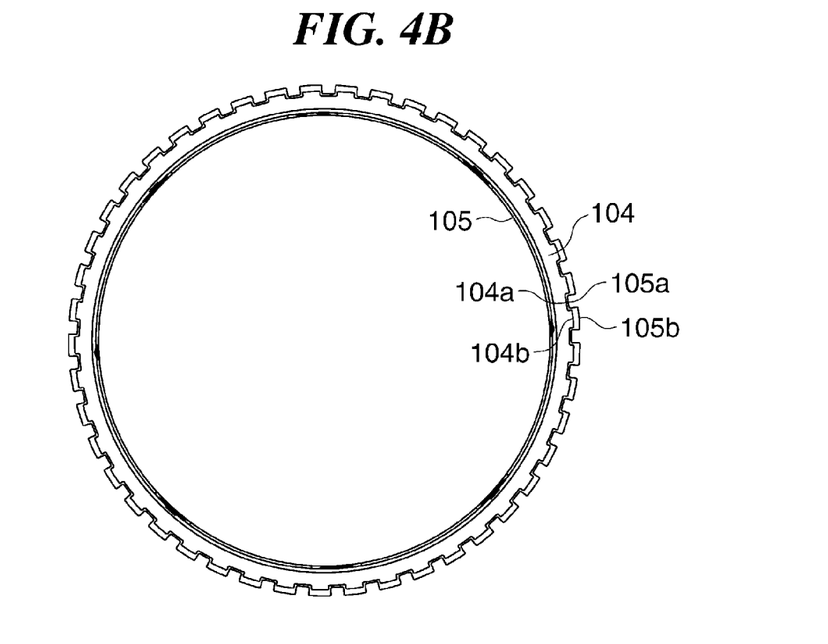
FIG. 4B is a front view showing the rotary member and the sliding sheet after they are fitted together.

FIG. 4A is an exploded perspective view showing the rotary member 105 and the sliding sheet 104, and FIG. 4B is a front view showing the rotary member 105 and the sliding sheet 104 after they are fitted together.

As shown in FIGS. 4A and 4B, the rotary member 105 is ring-shaped, and in an outer peripheral portion of the rotary member 105, concave portions 105a and convex portions 105b are alternately formed at substantially regular intervals in a circumferential direction. The multiple convex portions 105b act as light-shielding members for the photo interrupters 112a and 112b. The click holes 105c are formed on an inner peripheral side of the concave portions 105a and the convex portions 105b. The multiple click holes 105c are formed in the rotary member 105 such that they are aligned with the multiple convex portions 105b in a direction perpendicular to a rotation center of the rotary member 105 (a diametrical direction of the rotary member 105). The number of click holes 105c is the same as the number of convex portions 105b. Therefore, each of the multiple concave portions 105a is placed between the click hole 105c and the click hole 105c adjacent to each other in the circumferential direction. Here, the concave portions 105a correspond to exemplary first concave portions of the present invention, and the convex portions 105b correspond to exemplary first convex portions of the present invention. The sliding sheet 104 corresponds to an exemplary sliding member of the present invention.

As described above, in the present embodiment, the click holes 105c are formed at the locations of the convex portions 105b acting as the light-shielding members for the photo interrupters 112a and 112b, and the concave portions 105a and the convex portions 105b are placed side by side in the circumferential direction. Namely, the click holes 105c, the concave portions 105a, and the convex portions 105b are formed in the rotary member 105 such that the click holes 105c and the concave portions 105a are not aligned in the direction perpendicular to the rotation center of the rotary member 105 (the diametrical direction of the rotary member 105).

As with the rotary member 105, the sliding sheet 104 as well is ring-shaped, and in an outer peripheral portion of the sliding sheet 104, concave portions 104a and convex portions 104b are alternately formed at substantially regular intervals in a circumferential direction. The concave portions 104a correspond to exemplary second concave portions of the present invention, and the convex portions 104b correspond to exemplary second convex portions of the present invention. The width of the concave portion 104a of the sliding sheet 104 in the circumferential direction is greater than that of the concave portion 105a of the rotary member 105 in the circumferential direction. The width of the convex portion 104b of the sliding sheet 104 in the circumferential direction is smaller than that of the convex portion 105b of the rotary member 105 in the circumferential direction.

The outer diameter of the sliding sheet 104 in the concave portion 104a of the sliding sheet 104 is smaller than that of the rotary member 105 in the concave portion 105a of the rotary member 105. The outer diameter of the sliding sheet 104 in the convex portion 104b of the sliding sheet 104 is smaller than that of the rotary member 105 in the convex portion 105b of the rotary member 105.

The sliding sheet 104 is fixed to the rotary member 105 with double-faced tape or the like such that the concave portion 104a of the sliding sheet 104 and the concave portion 105a of the rotary member 105 overlap each other, and the convex portion 104b of the sliding sheet 104 and the convex portion 105b of the rotary member 105 overlap each other. Also, the sliding sheet 104 is fixed to the rotary member 105 from the other side of the side on which the ball 107 is disposed so as to cover the click holes 105c of the rotary member 105. Namely, the rotary member 105 is sandwiched between the ball 107 and the sliding sheet 104. The sliding sheet 104 is fixed to the rotary member 105 to cover up the click holes 105c of the rotary member 105 without projecting from the outer diameter portion of the rotary member 105. This ensures satisfactory sliding performance of the front base member 153 and the rotary member 105, and at the same time, prevents light from the click holes 105c from arriving at the photo interrupters 112a and 112b to cause false detection.

Figure 5A:
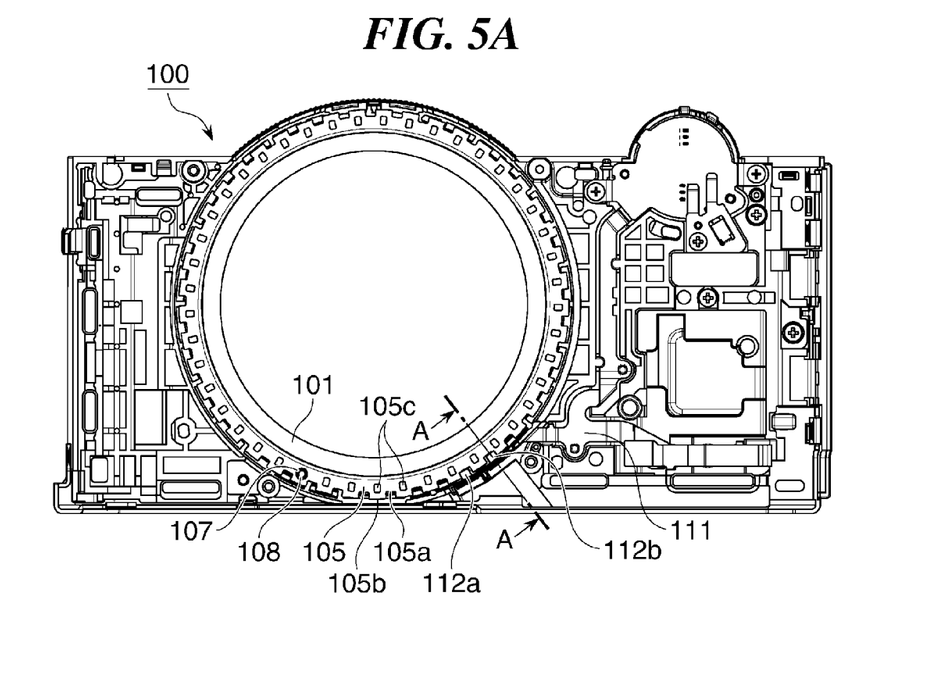
FIG. 5A is a view showing the front cover unit as seen from inside.
Figure 5B:
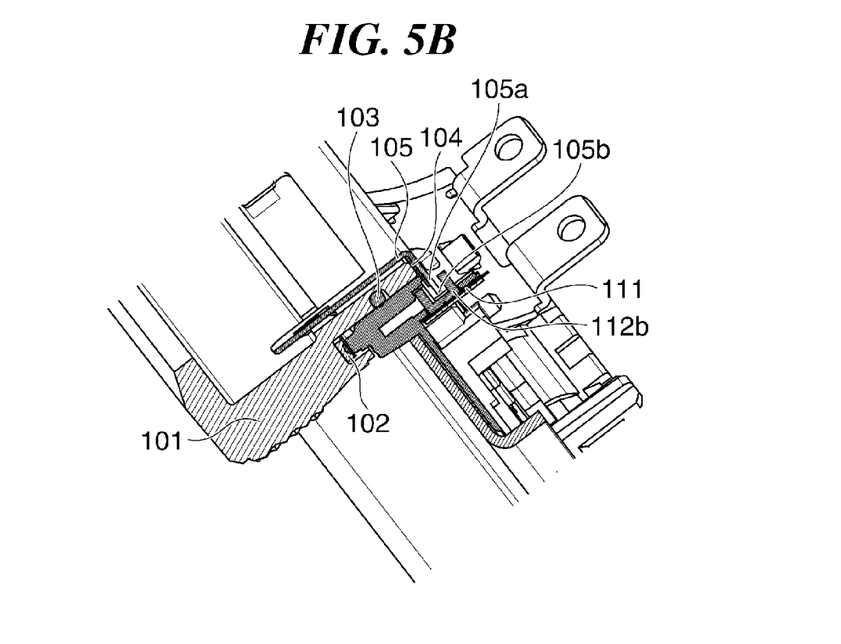
FIG. 5B is a cross-sectional view taken along line A-A in FIG. 5A.

FIG. 5A is a view showing the front cover unit 100 as seen from inside, and FIG. 5B is a cross-sectional view taken along line A-A in FIG. 5A. FIG. 5A shows a state where the ball 107 is engaged with the click hole 105c of the rotary member 105. It should be noted that the holding member 106, the spring holding member 109, and the screws 110 are omitted from FIG. 5A for the convenience of explanation.

First, a description will be given of a click mechanism. The ball 107 is pressed against the rotary member 105 by urging force of the spring 108. In the rotary member 105, the multiple click holes 105c are provided at substantially regular intervals in the circumferential direction as described earlier. The width of the click hole 105c is set to be smaller than the diameter of the ball 107.

As the rotary member 105 rotates in conjunction with the operating ring 101 around an optical axis of the lens barrel 2, the ball 107 repeatedly comes to a state of being engaged with the click hole 105c and a state of being pulled out from the click hole 105c. When the ball 107 is engaged with the click hole 105c and when the ball 107 runs on to an area between the click hole 105c and the click hole 105c, a click feel is generated. It should be noted that a desired click feel is obtained by adjusting urging force of the spring 108, adjusting the size of the ball 107, and adjusting the hole width of the click hole 105c.

Referring to FIG. 5B, the concave portion 105a of the rotary member 105 lies near the center of the photo interrupter 112b. Namely, FIG. 5B shows a state where light from the photo interrupter 112b is not shielded. Similarly, light from the photo interrupter 112a as well is not shielded although this is not shown in the figure.

Figure 6:
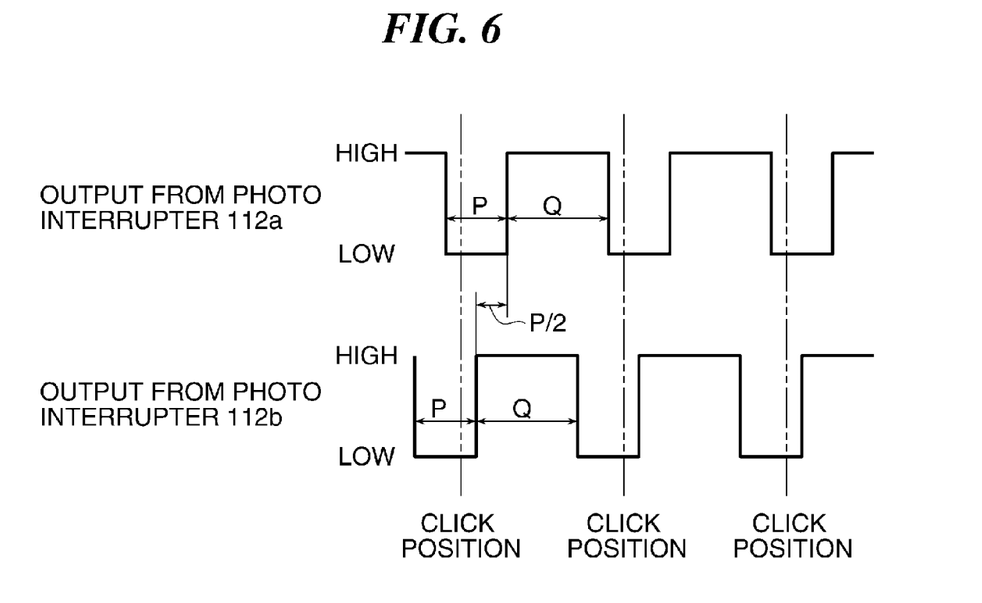
FIG. 6 is a timing chart of output signals from photo interrupters when the rotary member is rotated clockwise from a click position in FIG. 5.

FIG. 6 is a timing chart of output signals from the photo interrupters 112a and 112b when the rotary member 105 is rotated clockwise from the click position in FIG. 5. The output signals from the photo interrupters 112a and 112b become H (high) when light from the photo interrupters 112a and 112b is shielded, and the output signals from the photo interrupters 112a and 112b become L (low) when light from the photo interrupters 112a and 112b is not shielded. As described earlier, when the ball 107 lies at a position where it is engaged with the click hole 105c, light from the photo interrupters 112a and 112b is not shielded, and hence the output signals from both the photo interrupters 112a and 112b are L.

Where an angle at which light from the photo interrupters 112a and 112b is not shielded, that is, an angle of the concave portion 105a of the rotary member 105 is P, and an angle at which light from the photo interrupters 112a and 112b is shielded, that is, an angle of the convex portion 105b of the rotary member 105 is Q, one period is expressed by P+Q. This corresponds to one pitch between the click holes 105c. In order to detect a rotational direction and a rotationally-operated amount of the rotary member 105, that is, the operating ring 101, the photo interrupters 112a and 112b are disposed at locations where the output signal from the photo interrupter 112a and the signal output from the photo interrupter 112b are P/2 out of phase with each other.

On this condition, the photo interrupter 112a and the photo interrupter 112b do not need to be placed adjacent to each other. When the rotary member 105 is rotationally operated one pitch clockwise, the output signals from the photo interrupter 112a and the photo interrupter 112b change from "L-L" to "L-H" to "H-H" to "H-L" in this order and return to "L-L".

When the rotary member 105 is rotationally operated one pitch counterclockwise, the output signals from the photo interrupter 112a and the photo interrupter 112b change from "L-L" to "H-L" to "H-H" to "L-H" in this order and return to "L-L".

When the signals output from the two photo interrupters 112a and 112b start from "L-L" and change to "L-H", it is detected that the rotary member 105 is rotated clockwise, and when the signals output from the two photo interrupters 112a and 112b start from "L-L" and change to "H-L", it is detected that the rotary member 105 is rotated counterclockwise. When the output signals from the two photo interrupters 112a and 112b start from "L-L" and return to "L-L", it is detected that the rotary member 105 has been rotationally operated one pitch. In this manner, a rotation direction and a rotationally-operated amount of the operating ring 101 are detected. It should be noted that although in the present embodiment, light from the photo interrupter 112a and the photo interrupter 112b is not shielded when the ball 107 is at such a position as to be engaged with the click hole 105c, the present invention is not limited to this. Namely, even if light from the photo interrupter 112a and the photo interrupter 112b is shielded when the ball 107 is at such a position as to be engaged with the click hole 105c, the same operational effects are obtained. It should be noted that the click holes 105c, the ball 107, and the photo interrupters 112a and 112b correspond to an exemplary detection unit of the present invention.

As describe above, in the present embodiment, since the click holes 105c and the concave portions 105a are not aligned in the diametrical direction of the rotary member 105, the size of the rotary member 105 in the diametrical direction is reduced. To form the click holes 105c in the rotary member 105, the rotary member 105 is required to be of sufficient size in the diametrical direction. In the present embodiment, the click holes 105c are allowed to be formed in areas where the convex portions 105b are formed and the rotary member 105 has extra space in the diametrical direction. Thus, the click holes 105c, the convex portions 105b, and the concave portions 105a are formed in the rotary member 105 without enlarging the outer diameter of the rotary member 105. As a result, in the present embodiment, the size of the operating ring 101 in the radial direction, and by extension the size of the digital camera 1 is reduced while good operability is ensured using the click mechanism of the operating ring 101.

Figure 7A:
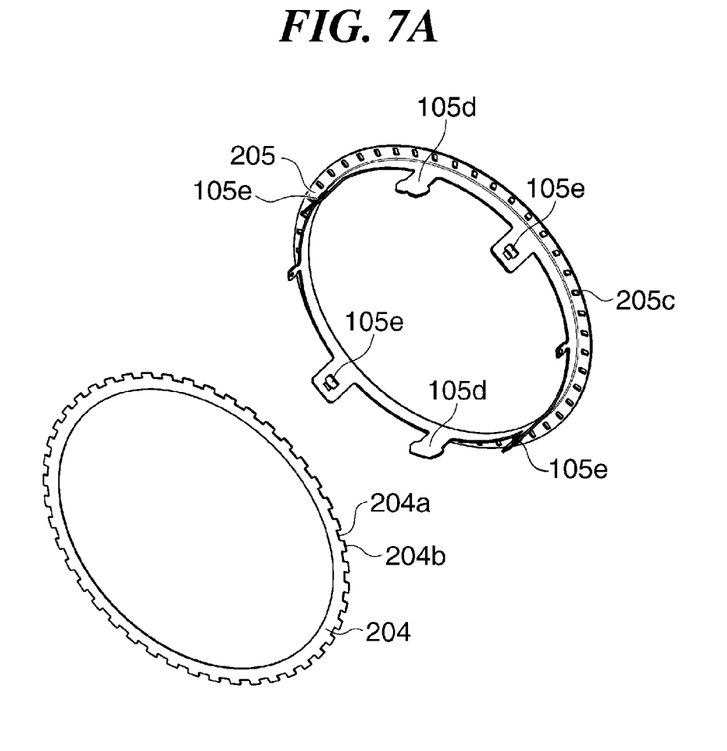
FIG. 7A is an exploded perspective view showing a rotary member and a sliding sheet.
Figure 7B:
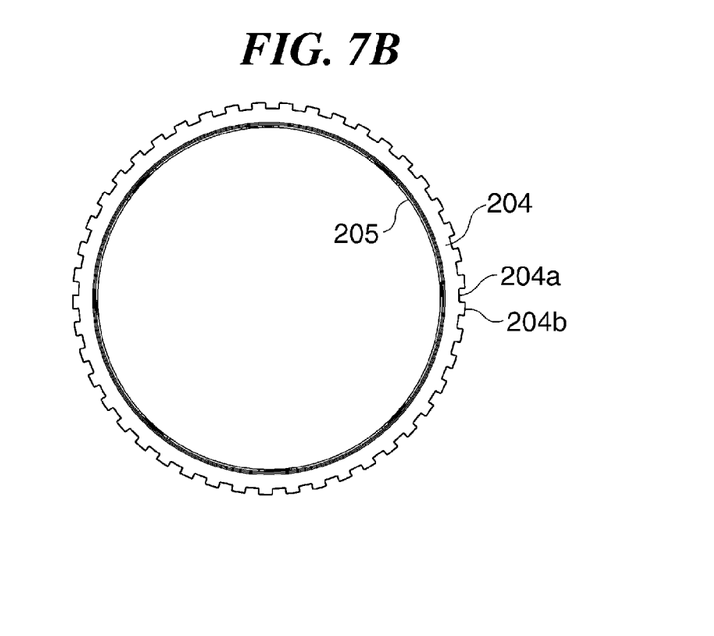
FIG. 7B is a front view showing the rotary member and the sliding sheet after they are fitted together in a digital camera that is a second embodiment of the electronic apparatus according to the present invention.

Referring next to FIGS. 7A and 7B, a description will be given of a digital camera that is a second embodiment of the present invention. It should be noted that the same components as those of the first embodiment described above are designated by the same reference symbols in the drawings, and description thereof is omitted.

FIG. 7A is an exploded perspective view showing a rotary member 205 and a sliding sheet 204, and FIG. 7B is a front view showing the rotary member 205 and the sliding sheet 204 after they are fitted together. As shown in FIG. 7A, the rotary member 205 is ring-shaped, and in a circumferential direction, multiple click holes 205c are formed at substantially regular intervals. In an outer peripheral portion of the rotary member 205, convex and concave portions are not formed as distinct from the first embodiment.

As with the rotary member 205, the sliding sheet 204 as well is ring-shaped, and in an outer peripheral portion of the sliding sheet 204, concave portions 204a and convex portions 204b are alternately formed at substantially regular intervals in a circumferential direction.

As shown in FIG. 7B, the multiple convex portions 204b of the sliding sheet 204 project outward in a radial direction from the outer diameter of the rotary member 205. The concave portions 204a of the sliding sheet 204 have substantially the same outer diameter as that of the rotary member 205. The sliding sheet 204 is substantially concentrically fixed to the rotary member 205 with double-faced tape or the like in a state where they are placed in phase with each other using a jig or the like such that the concave portions 204a and the click holes 205c are not aligned in a direction perpendicular to a rotation center of the rotary member 205 (a diametrical direction of the rotary member 205). It should be noted that the number of concave portions 204a and the number of convex portions 204b are the same as the number of click holes 205c. The sliding sheet 204 is fixed to the rotary member 205 from the other side of the side on which the ball 107 disposed so as to cover the click holes 205c of the rotary member 205. Namely, the rotary member 205 is sandwiched between the ball 107 and the sliding sheet 204.

In this fixed state, the click holes 205c of the rotary member 205 are covered with the sliding sheet 204, and the convex portions 204b of the sliding sheet 204 act as light-shielding members for the photo interrupters 112a and 112b. This ensures satisfactory sliding performance of the front base member 153 and the rotary member 205, and at the same time, prevents light from the click holes 205c from arriving at the photo interrupters 112a and 112b to cause false detection. Other constructions and operational effects are the same as those of the first embodiment described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-179612, filed Sep. 11, 2015 which is hereby incorporated by reference herein in its entirety.

What is claimed is:
1. An electronic apparatus comprising:
a rotationally-operated member;
a rotary member configured to be able to rotate integrally with said rotationally-operated member, and comprise first concave portions and first convex portions that are formed alternately in an outer peripheral portion, and multiple click holes formed on an inner peripheral side of the first concave portions and the first convex portions in a circumferential direction;
a click feel generating member configured to, in response to said rotationally-operated member being rotationally operated, repeatedly comes to a state of being in engagement with the click hole and to a state of being pulled out from the click hole to generate a click feel on said rotationally-operated member; and a detection unit configured to, in response to said rotationally-operated member being rotationally operated, repeatedly comes to a state of detecting the first concave portions of said rotary member and to a state of detecting the first convex portions of said rotary member to detect a rotating direction and a rotationally-operated amount of said rotationally-operated member, wherein the click holes, the first concave portions, and the first convex portions are formed in said rotary member such that the click holes and the first concave portions are not aligned in a direction perpendicular to a rotation center of said rotary member.

2. The electronic apparatus according to claim 1, further comprising:

a base member configured to be sandwiched between said rotationally-operated member and said rotary member; and a sliding member configured to be placed between said rotary member and said base member and slide in contact with said base member in a rotational direction when said rotary member rotates.

3. The electronic apparatus according to claim 2, wherein said sliding member is fixed to said rotary member from an opposite side of a side on which said click feel generating member is placed such that the click holes are covered with said sliding member.

4. The electronic apparatus according to claim 2, wherein second concave portions and second convex portions are alternately formed in an outer peripheral portion of said sliding member, and said sliding member is fixed to said rotary member such that the second concave portions and the first concave portions overlap each other, and the second convex portions and the first convex portions overlap each other.

5. The electronic apparatus according to claim 1, further comprising a lens barrel, wherein said rotationally-operated member is an operating ring disposed on an outer peripheral side of said lens barrel.

6. The electronic apparatus according to claim 1, wherein said click feel generating member is a member with a spherical shape urged toward the click holes.

* * * * *